(12) United States Patent
Leung

(10) Patent No.: US 8,795,616 B2
(45) Date of Patent: Aug. 5, 2014

(54) METHOD FOR THE TREATMENT OF WASTE GAS WITH A DUAL-PURPOSE REACTOR INTEGRATED WITHIN CEMENT PRODUCTION FACILITY AND THE SYSTEM THEREOF

(75) Inventor: Ching Chiu Leung, Sheung Shui (CN)

(73) Assignee: Satarem Technologies Limited, Central Hong Kong (CN)

(*) Notice: Subject to any disclaimer, the term of this patent is extended or adjusted under 35 U.S.C. 154(b) by 0 days.

(21) Appl. No.: 13/981,230

(22) PCT Filed: Dec. 26, 2011

(86) PCT No.: PCT/CN2011/084683
§ 371 (c)(1),
(2), (4) Date: Jul. 23, 2013

(87) PCT Pub. No.: WO2012/100618
PCT Pub. Date: Aug. 2, 2012

(65) Prior Publication Data
US 2014/0024880 A1    Jan. 23, 2014

(30) Foreign Application Priority Data

Jan. 28, 2011 (CN) ........................ 2011 1 0029962

(51) Int. Cl.
*F23G 7/06* (2006.01)
*B01D 53/34* (2006.01)
*B01D 53/74* (2006.01)

(52) U.S. Cl.
USPC ............ 423/210; 423/245.3; 423/215.5; 422/168; 106/704; 106/745; 106/761; 106/762; 431/5; 110/345

(58) Field of Classification Search
USPC ............... 423/210, 245.3, 215.5; 422/168; 106/704, 745, 761, 762; 431/5; 110/345
See application file for complete search history.

(56) References Cited

U.S. PATENT DOCUMENTS

| 5,259,876 A * | 11/1993 | Enkegaard ............... 106/761 |
| 6,855,302 B2 * | 2/2005 | Eckert et al. ............ 423/210 |
| 2010/0158773 A1 * | 6/2010 | Schwab .................. 423/210 |
| 2012/0039778 A1 * | 2/2012 | Schwab .................. 423/210 |

FOREIGN PATENT DOCUMENTS

| CN | 1778752 | 5/2006 |
| CN | 1780799 | 5/2006 |
| CN | 101761928 | 6/2010 |
| CN | 101776269 | 7/2010 |
| DE | 34 11 144 A1 * | 10/1985 ............... 106/761 |

* cited by examiner

*Primary Examiner* — Timothy Vanoy
(74) *Attorney, Agent, or Firm* — Cesari and McKenna, LLP (57) ABSTRACT

A system and method of using a double-effect-reactor to dispose incinerated flue gas and improve cement yields. The double-effect-reactor features an incinerated reaction chamber and a gas-solid suspension mixing chamber. The system includes the double-effect-reactor, a high temperature dust-arrester, a system for recovery of thermal energy and dust removal, a triple valve, and an independent chimney. Also disclosed is a method in which combines the double-effect-reactor with a cement production system.

20 Claims, 2 Drawing Sheets

METHOD FOR THE TREATMENT OF WASTE GAS WITH A DUAL-PURPOSE REACTOR INTEGRATED WITHIN CEMENT PRODUCTION FACILITY AND THE SYSTEM THEREOF

CROSS REFERENCE TO RELATED APPLICATION

This application is a national stage application, filed under 35 U.S.C. §371, of PCT Application No. PCT/CN2011/084683, filed on Dec. 26, 2011, entitled "A METHOD OF DISPOSING WASTE GAS USING DOUBLE-EFFECT-REACTOR COMBINED WITH CEMENT PRODUCTION AND A SYSTEM THEREOF", which claimed priority to Chinese Application No. 201110029962.6, filed on Jan, 28, 2011, all of which are hereby incorporated by reference in their entirety.

FIELD OF THE INVENTION

The present invention relates to a method for the treatment of combustion gas utilizing a dual-purpose reactor (DPR), and in particular, to a method for treating exhaust gases and increasing cement production by utilizing a dual-purpose reactor in combination with cement production facility. The method eradicates the generation of exhaust gases, acid gases, dioxins and their precursors generated in the cement production process and utilizes waste heat for power generation.

BACKGROUND OF THE INVENTION

Incineration technology is used as a treatment for a very wide range of wastes, including industrial wastes, medical wastes, hazardous wastes and municipal wastes and so on. The incineration process generates large amount of toxic exhaust gases, especially acid gases, dioxins and other toxic substances. The toxic substances generated are not treated properly, they will cause severe damage to the environment.

Dioxin is a general term that describes a group of hundreds of chemical compounds comprising of two groups of organic compounds. Dioxins are colorless, odorless, hydrophilic and extremely toxic, which are that are highly persistent in the environment. Dioxins contains approximately 200 kinds of compounds, which are chemically stable, high melting points, and water insoluble, but soluble in most of organic solvents. Therefore dioxins are apt to accumulate within the organism.

Generally, dioxins are generated by organic compounds or inorganic chloride in a catalyst existing condition, as well as by organic chloride of dioxin precursors. It is known that during combustion processing, dioxins can be produced via chemical reaction occurring between hydrocarbon compounds and organic Chlorides. From current studies, dioxins formation can be contributed to following:
 a. In incineration process of plastics comprising chloride, the burning temperature is lower than 800° C. and the burning process is incomplete;
 b. Other materials comprising chloride and carbon such as paper, woodwork, food residues lead to dioxins after catalyzing by metal ions such as copper and cobalt;
 c. Chemicals for producing items such as pesticides, especially chemicals comprising chloride. Dioxins are generated from industrial wastes, medical wastes, hazardous wastes and municipal wastes, such as burning of wastes, production of cements or steels, pesticides and herbicides, polychlorinated biphenyl. Plastic made of polyvinyl chlorides (PVCs) used in everyday life comprises chloride and will release dioxins when being burned.

Plenty of toxic gases are generated from burning, including hydrogen chloride gas (HCl), hydrogen fluoride gas (HF), ammonia (NH3), sulfur dioxide ($SO_2$), hydrogen cyanide gas (HCN), hydrogen sulfide ($H_2S$), etc., which cause huge economic lost and aggravate environmental burden.

Therefore, in order to avoid potential damage to the human health and environment, dioxins and toxic gases from waste burning must be removed before releasing to the atmosphere. Efficient exhaust gases treatment technology can significantly reduce this risk produced by waste burning process.

A lot of poisonous gases are produced during cement production processing using high temperature firing method, which is characterized by large amount of material and powder consumptions. In the material crushing, conveying, grinding, burning, packaging, storage and other sectors of cement manufacture process, almost each procedure is associated with generation and emission of hazardous gases, among which, the most damaging, is the largest emissions of $SO_2$, $NO_x$ and other acid gases and dioxins generated in the clinker calcining process.

Currently, rapid cooling, lime spraying, activated carbon absorption techniques are popularly adopted in treatment of organic matter, toxic and acid gases generated from high temperature combustion process.

As presented in the Chinese patent application CN101200643 "Gasification facilities and technology of burnable waste without byproduct of dioxin" and CN1953944 "Clinker production technique using bypassing system to extract the converter gas with harmful substances", high temperature fuel-gases are quenched to 200° C. to avoid dioxin reforming. This rapid cooling method can effectively remove harmful gases, however, it also leads to waste of heat energy, as well as large water consumption and increased treatment costs.

In Chinese Patent Application CN101143292 "A treatment using saline-alkaline slag to remove acid gases", alkali spraying technique is selected for the treatment of acid gases. However, by using such a method it is apt to resulting in high temperature corrosion and low temperature corrosion of flue and heat exchanger. In addition, bulky equipments are required.

In activated carbon adsorption system, dioxins are just adsorbed into activated carbon, not fundamentally removed, and subsequent expensive treatment measures are needed. Other methods such as using electron beam to destroy the dioxins has the problem of a requirement for high voltage facilities, small handling capacity and large consumption of energy.

In Chinese Patent Application CN101143292 "Methods and procedures of waste-to-energy co-combustion", the technique of co-combustion and reaction of alkaline materials and waste in a high-temperature combustion chamber is applied to remove acid gases and dioxins. However, it is not a good choice for energy saving aim, as well as high requirement of materials of reactor, since its high reaction temperature, nearly 1200. Generally, if combustion temperature is as high as 1400~1600° C., corundum bricks containing 90% of $Al_2O_3$ are required for wall materials of combustion chamber. However, when combustion temperature is 850 to 950, only II-type corundum bricks containing 60% to 75% of $Al_2O_3$ can already fulfill combustion requirements.

Therefore, it is urgent to develop a simple, low-cost technology that can remove acid gases and elimination most of toxic dioxins and their precursors, thus to avoid re-formation of dioxins during energy recovery process. To achieve purpose aforementioned, the present invention provides a method, i.e., Cement Processing—Oxidative Waste & Energy Recovery, C-POWER, which combines cement production system to handle the waste gas and increase cement production.

SUMMARY OF THE INVENTION

The object of the present invention is to provide a method for treating exhaust gases generated from cement manufacture processing and increase cement production by utilizing a system that integrating cement production with a dual-purpose reactor (DPR). According to the invention, dioxins and their precursors, acid gases are completely removed, and heat energy from cement production is reused to generate electricity power.

The invention relates to a method for treatment of combustion gas and increase of cement production by combining a dual-purpose reactor with cement production system, wherein said dual-purpose reactor comprises a connected combustion chamber and a gas-solid suspension chamber, which includes the following procedures:
 (a) high temperature gases from clinker manufacture stage of cement production line are introduced to the combustion chamber of the dual-purpose reactor and/or to the rotary incinerator of a waste combustion system,
 (b) alkaline materials or waste residues from cement production system are fed into the combustion chamber of the dual-purpose reactor,
 (c) fuel or wastes of high caloric value are injected into the combustion chamber to raise and then stabilize the temperature in the combustion chamber,
 (d) waste combustion gas is introduced into the combustion chamber and/or to the gas-solid suspension chamber,
 (e) under high-temperature condition, mixture of gases and said alkaline materials or waste residues in the combustion chamber enters in a spiral form the gas-solid suspension chamber of dual-purpose reactor, in which said gases are completely mixed and reacted with the alkaline materials or waste residues, so that acid gases, dioxins and precursors thereof are removed,
 (f) a gas-powder mixture released from the dual-purpose reactor is introduced into a high-temperature gas filter where the gases are separated from solid materials, and after energy recovery and filter processing, the gases are then released into the atmosphere via an independent stack as nontoxic gases with a temperature of 120 to 150° C.,
 (g) decomposed alkaline materials or wastes are transferred either to the combustion chamber of the dual-purpose reactor for recycling or to cement kiln as raw materials.

In the present invention, the term "waste combustion gas" may be referred to the term "combustion gas" or "waste combustion gases".

In one aspect of the present invention, the waste combustion gas or combustion gases to be treated can be flue-gases produced from incineration of industrial waste, medical waste, hazardous waste or municipal domestic waste utilizing a rotary incinerator.

In one aspect of the present invention, said high temperature gases are from a grate cooler in clinker manufacture stage.

In one aspect of the present invention, high temperature gases from a by-pass system of cement production are also drawn via a duct into the combustion chamber of DPR.

In present invention, both high temperature gases from clinker cooler and/or a by-pass system of cement production can be fed into the rotary incinerator. In addition, wastes or fuels of high calorific value can be fed into the rotary incinerator.

In one aspect of the present invention, the residence time of said fuels or wastes of high caloric value in the combustion chamber is not less than 2 seconds.

In one aspect of the method of the present invention, in the procedure from (c) to (e), the temperature in the connected combustion chamber and gas-solid suspension chamber of DPR is maintained at 850° C. to 950° C., preferred 850° C. to 920° C., and most preferred 860° C. to 890° C.

In one aspect of the method of the present invention, the amounts of alkaline materials and cement residual used are 20 to 85 times of their molar mass of chemical reaction process. That is, the amount needed to neutralize all acid gases and to remove all dioxin precursors by chemical reactions.

In one aspect of the method of the present invention, the total residence time of the combustion gas in the combustion chamber and the gas-solid suspension chamber is 6 to 8 seconds, preferably 8 to 10 seconds.

The invention also provides a system for the method for treatment of combustion gases and increase of cement production by combining a dual-purpose reactor with cement production system as mentioned above. The system includes: a dual-purpose reactor 10, a high-temperature filter 20, a heat recovery and gas filter system 30, a three-way valve 40 and an independent stack 60, wherein said dual-purpose reactor 10 consists of a connected combustion chamber 11 and a gas-solid suspension chamber 12, wherein the combustion chamber 11 is connected to a grate cooler of cement production system 50 to receive high temperature gases produced during clinker manufacture process, and said combustion chamber 11 has an inlet to receive alkaline materials or residuals from raw material preparation and homogenization system of cement production, wherein said three-way valve 40 is connected to the high temperature filter 20, the combustion chamber 11 and the rotary kiln 523 of cement production system 50 respectively, and through which decomposed alkaline materials or residues are fed into the combustion chamber for recycling or into the rotary kiln of cement production system as raw materials to produce cement clinker.

In one aspect of the present invention, in the system, said rotary incinerator 132 is connected with the combustion chamber 11 via a high-temperature duct. Flue gases from said rotary incinerator 132 can be discharged to the combustion chamber 11. In another aspect of the present invention, Flue gases from said rotary incinerator 132 can be discharged to the gas-solid suspension chamber 12.

In one aspect of the present invention, in the system, said combustion chamber 11 and rotary incinerator 132 (or named as rotary kiln) are connected with the clinker calcining system 52 of cement production system 50, to receive high temperature gases produced from cement manufacture processing, such as hot gases from grate cooler 524. Besides, combustion chamber 11 includes an material inlet to receive alkaline materials or alkaline wastes from the raw material preparation station and homo silo system 51.

In one aspect of the present invention, in the system, said three-way valve 40 is operatively connected with, respectively, to high-temperature filter 20, combustion chamber 11, and rotary kiln 523. Decomposed alkaline solid materials are discharged into the rotary kiln (rotary incinerator) of cement production system. If the rotary kiln do not receive said materials, the materials will be transferred to the combustion chamber.

In one aspect of the present invention, in the system, said burning system 13 consists of material feeder 131 and rotary incinerator 132. Wastes such as industrial wastes, medical wastes, hazardous wastes and municipal domestic wastes, are fed into rotary incinerator 132 via material feeder 131, and are dried and burned in rotary incinerator 132. flue gases generated are introduced to combustion chamber 11 for further processing.

In one aspect of the present invention, in the system, said clinker calcining system 52 of cement production consists of preheater 521, pre-calciner 522 and rotary kiln 523, grate cooler or clinker cooler 524. In one aspect of the present invention, the system comprise an independent stack for emission of gases from clinker calcining system of cement production.

In one aspect of the present invention, in the system, said by-pass system 55 of cement production comprises quenching devices 551 and heat recovery and filter system 552. Exhaust gases containing materials of sulfur, chlorine, potassium, and sodium etc. generated from rotary kiln are introduced to quenching devices 551 for rapid cooling and then are flowed through heat recovery and filtering system 552 and is released into the atmosphere via a stack. Solid powders collected down are conveyed to cement grinding system and used as cement admixtures.

Advantages of the Present Invention are as Below:
   a. According to the invention, alkaline materials and cement residues from cement producing line and hot exhaust gases are mixed and reacted in a dual-purpose reactor under high temperature condition and herein all toxin composition such as acid gases, dioxins of combustion exhaust gases are removed in a initial stage, which is prior to the hot gases passing through the heat recovery boilers, thereby on the one hand protecting efficiently the process devices from being corroded by acidic gases, and on the other hand, lime spray procedure typically utilize in conventional exhaust gases treatment systems are saved.
   b. The heat recovery efficiency is higher than the existing harmful gases purifying methods because the purified exhaust gases release from the dual-purpose reactor will not generate dioxins in heat recovery processing, therefore, the utilizable scope of heat energy of flue ashes come out from the incineration reactor chamber is high, which is 850~950° C. and the range reaches 120~150° C.
   c. The high temperature harmful gases are heated up to 850-950 inside the inclination chamber, and have 6-10 seconds suspension time of the gases in the gas-solid suspension mixing chamber, the present technique is much more effective than existing techniques for the complete removing dioxins and their precursors of hydrocarbon organic compounds, organic chlorine and inorganic chloride etc.
   d. Cost of exhaust gas treatment is reduced according to the invention because alkaline materials and waste residues produced in the cement production line can be utilized circularly.
   e. Nitrogen oxides ($NO_x$) is reduced to be less than 100 $mg/Nm^3$ by introducing sufficient reduction agents, for example urea and ammonia gas, into the gas-solid suspension chamber.
   f. Cement production is increased by more than 10% by the method and system of the present invention which combines cement production with waste gas treatment.

Besides, by combining with the DPR system of the present invention, hazardous element such as sulfur, chlorine, potassium and sodium etc, generated in cement production process can also be discharged, cooled down and collected by the by-pass system. And solids collected down can be used as cement admixtures.

The invention provides a method and system for absorbing acid gases, removing dioxins and their precursors which include organic hydrocarbons, organic chlorides, inorganic chlorides, which is operated continuously under high temperature condition. By using this technology, on one hand, toxic organic particles, acid gases such as CO, $SO_2$, HCl, HF, and dioxins are removed. In addition, stable, high temperature gases recourses are obtained.

BRIEF DESCRIPTION OF DRAWINGS

The invention will now be described in further details with reference to the following drawings.

DETAIL DESCRIPTION OF THE INVENTION

The method and system with dual-purposes reactor (DPR) have been carried out in small scale trial and middle scale trial in the industry.

Further detail description combined with drawings is provided as below.

Figure 1:
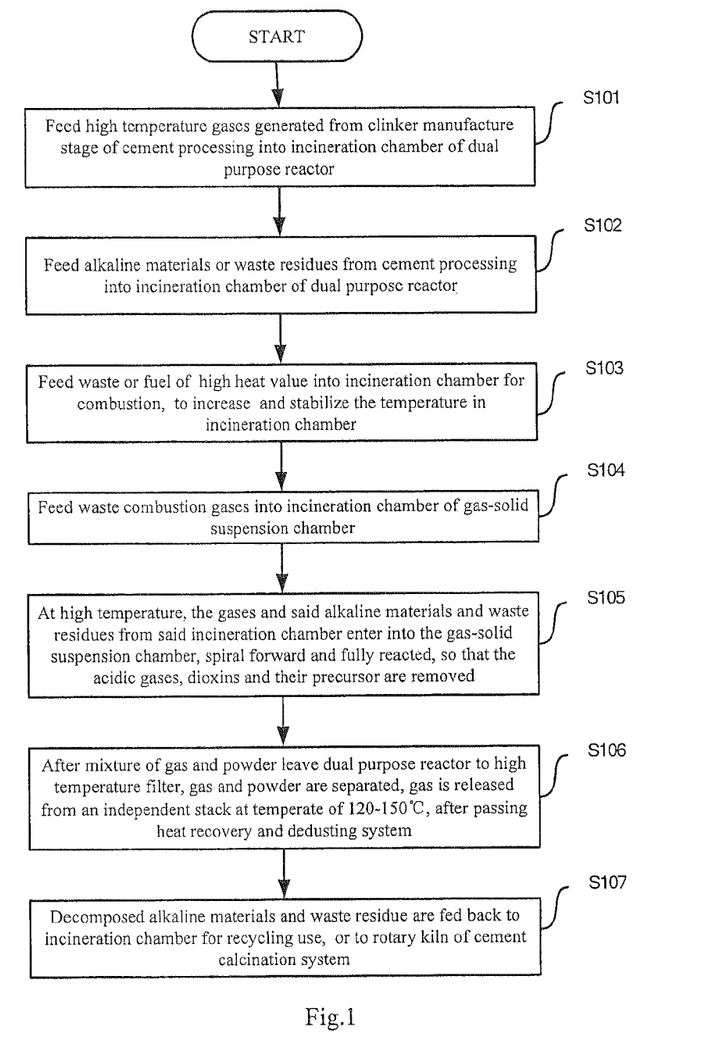
FIG. 1 is the flow chart of an embodiment of this invention.

FIG. 1 shows a flow sheet of embodiment for the waste gas treatment method according to the invention.

In Procedure S101, high temperature gases generated from grate cooler of cement production system are introduced into the combustion chamber of dual-purpose reactor via ducts. In another aspect, the high temperature gases can be introduced into the rotary incinerator of an incineration system.

A cement kiln plant mainly comprises three phases: raw meal preparation, clinker burning and cement grinding system.

Raw meal preparation process mainly includes raw materials (mainly limestone or clay) extraction and raw materials crushing and grinding procedure to guarantee cement quality. Properties of raw materials from cement production system basically meet the requirements of alkaline materials and/or waste used in an dual-purpose Reactor system.

Clinker burning process typically comprise four stages, pre-heating, calcination (heat treatment process, and generation of CaO), sintering and cooling. Calcination stage is vital to clinker manufacture process. Raw meal weighed continuously are charged into the cyclones at the top of the preheater and moving down through the preheater in counterflow with the exhaust hot gas, and is finally burned into clinker in a rotary kiln at temperature of 1450° C. The clinker from kiln fall down into a cooler where cooling of the clinker by means of air. Heated cooling air of temperature about 250° C.~350° C. is directed to the combustion chamber of DPR via a duct as combustion air.

According to the invention, aforementioned high temperature gases can also be introduced to the rotary incinerator of burning system via a duct.

In Procedure S102, alkaline materials or waste residues (mainly are raw cement materials) from cement production system are charged into the combustion chamber of dual-purpose reactor. Said alkaline materials or waste in the invention are solid powder materials.

In cement Plant, limestone materials and clay materials are two main raw materials. Limestone material is materials mainly contain calcium carbonate and certain amount of calcium hydroxide, such as limestone, marlstone, chalk, shells or the combination thereof. Clay materials mainly includes kaolin, montmorillonite, hydromica, other hydrated aluminium silicates or the combination thereof.

In order to achieve the target of removing acid gases and dioxin precursors, the amounts of alkaline materials used in the combustion chamber are 20 to 85 times of their molar mass of chemical reaction process, i.e., the amount needed to neutralization all acid gases and to remove all dioxin precursors by chemical reaction, which is far more than the qualities required for absorption of acidic gases. Alkaline materials will continuously keep their chemical absorption and physical adsorption properties during the whole treatment.

Alkaline materials and residuals used in procedure S102 are mainly from raw material bins in raw material preparation and homogenization system of cement line and can be fed directly into the combustion chamber for treatment of waste gases.

In procedure S102, in case the amounts of alkaline materials from raw materials preparation bin is not enough to remove all acid gases in exhaust gases, additional limestone materials from cement production are added.

In procedure S103, waste or fuels with high calorific value are fed into combustion chamber to improve and stabilize combustion temperature. Adding of waste or fuels with high calorific value serves the following purpose: 1. providing heat energy to dual-purpose reactor (DPR) and keeping temperature in DPR not less than 850, 2. providing gases which will pass the combustion chamber to the solid-gas suspension mixing chamber, to ensure the oxygen content of the gas at the gas outlet is no less than 8%, 3. providing heat energy for decomposition of alkaline materials to increase cement outputs. The said fuel can be fuel oil, coal or fuel gas. To guarantee fully incineration of fuel and wastes, the suspension time of fuel in combustion chamber is controlled to be no less than 2 seconds. In order to achieve full contact of air and fuels, fuels can be sprayed into the incineration chamber via an injector.

In one aspect of the method of the invention, said waste or fuels with high calorific value can be fed into the rotary incinerator to improve and stabilize the incinerating temperature.

In procedure S104, combustion gases such as flue gases from rotary incinerator are introduced into the combustion chamber and/or the solid-gas suspension chamber of DPR.

According to the invention, the waste gases to be treated are generated from combustion of industrial wastes, medical wastes, hazardous wastes and municipal wastes in a rotary incinerator. Acidic gases, such as CO, $SO_2$, HCl and HF etc. and plenty of dioxin precursors and harmful organics particles are produced during the combustion processing in rotary incinerator. These gases generated from waste combustion process are of high temperature because high-temperature incineration method is used to treat wastes. According to the invention, the high temperature gases are introduced into the combustion chamber of DPR via a duct. In another aspect, said high temperature gases also can be fed into the gas-solid suspension mixing chamber of DPR.

In procedure S105, gases in the combustion chamber of dual-purpose reactor are fully mixed and reacted with the said alkaline materials and waste residues to remove acidic gases, persistent organic, dioxins and dioxin precursors etc. from the exhaust gases.

Type of said gas-solid suspension chamber can be selected from spraying type, spiral-flow type, or their combined type, so that the alkaline materials are distributed evenly in the gas-solid suspension chamber as eddy motion state among waste gases, and fully exposure in the gases. In one aspect of the present invention, the gas-solid suspension chamber is a combined type of sprayed with swirl spinning.

Preferably, excess reducing agent such as urea and ammonia etc. are fed into gas-solid suspension mixing chamber to reduce the $NO_x$ concentration of gas to be less than 100 $mg/Nm^3$.

In procedures S102 to S105, the temperature in the connected combustion chamber and gas-solid suspension chamber of DPR is maintained at 850° C. to 950° C., preferred to 850° C. to 920° C., and most preferred 860° C. to 890° C.

In one aspect of the method of the present invention, the total residence time of combustion gases in the combustion chamber and the gas-solid suspension chamber is 6 to 8 seconds, preferably 8 to 10 seconds.

In procedure S106, the mixture of gases and powders are introduced into the high temperature filter, in which the gases and solid powders are separated. The gases are released.

According to the invention, preferably, for energy recovery and environmental protection purpose, gases from the high-temperature filter system firstly flow through heat recovery devices and then are released, at temperature about 120 to 150° C., into the atmosphere via an dependent stack after dedusting process.

According to the invention, clean gases from dedusting devices are released into the atmosphere via an dependent stack. An dependent stack means that the stack is only used in the waste treatment part of the system of the present invention, which is separated from the stack used in cement plant line. In the invention, the stack in cement production line just used to discharge gases generated from clinker manufacture process. Gases from the incinerator, such as a rotary incinerator, are passed and treated by the dual-purpose Reactor, heat energy recovery system and dedusting devices, then are released into the atmosphere via said independent stack. Therefore, according to the invention, gases emission system of cement production line is totally independent from the gases emission system of waste combustion system. Gases emission from the stack in cement production line should conform to the gas discharge standard required in cement industry, while gases emission through said independent stack used exclusively for waste gases treatment system should meet strict the gas emission standard of waste incinerator industry adopted by China and Europe.

In procedure S107, alkaline solids collected in the high temperature filter are charged either into the combustion chamber for recycling or to the rotary kiln of cement production line by means of a 3-way valve.

A cement kiln plant of a generally type also comprise s a by-pass system in clinker calcinations process. Generally, raw materials fed into the cement rotary kiln contain some adverse elements such as sulfur, chlorine, potassium and sodium etc., only part of which are solidified into the crystal lattice formation as clinker, and others cycle in the rotary kiln. Materials containing sulfur, chlorine, potassium and sodium etc. continuous accumulation in rotary kiln can result in pre-heater blocking thus affect the regular production of cement. Therefore, by-pass system is applied to cement production, which can effectively discharge redundant sulfur, chlorine, potassium and sodium etc. from rotary kiln. Essentially, by-pass system comprises a high temperature gas access. Flue-gases containing high concentration sulfur, chlorine, potassium and sodium etc. elements are drawn from the calcinations system of clinker manufacture via the by-pass access, then flow through cooling devices and filter system, finally are released into the atmosphere.

In the method of the present invention, after the cement kiln plant is combined with the DPR system, flue-gases containing materials of high concentration sulfur, chlorine, potassium and sodium can pass through the by-pass system and enter the DPR system, after treatment, said materials can be released, cooled and collected for mixture materials used in cement production.

Therefore, cement production can increase by 10% than the original design after by the cement kiln plant is combined with the DPR system, which utilizes the decomposed alkaline solids from waste gases treatment system.

According to the invention, gases from the by-pass system of cement production line can also be drawn either into the combustion chamber and the gas-solid suspension chamber of the dual-purpose reactor, or into the rotary incinerator of the incineration system.

Figure 2:
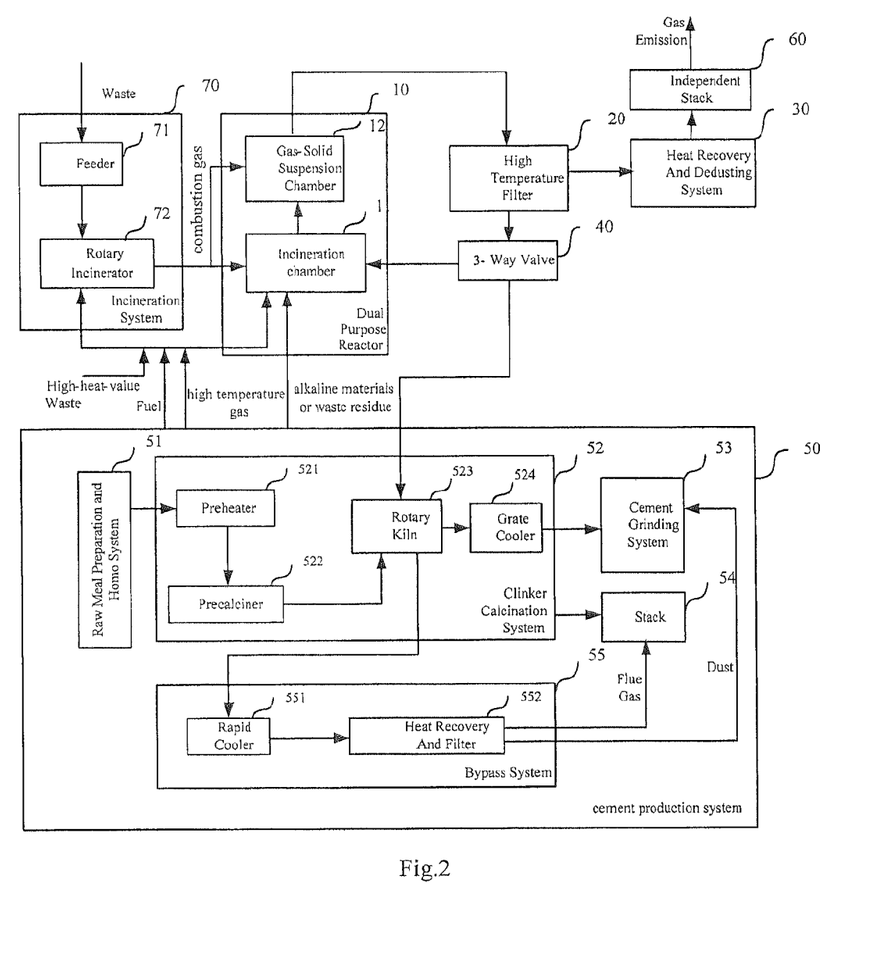
FIG. 2 is the structure diagram of an embodiment of this invention.

FIG. 2 shows an embodiment of the system of the present invention for dispose of combustion gases and increase of cement production by combining a dual-purpose reactor with cement production line system the dual-purpose reactor. The system includes:

a dual-purpose reactor 10, a high-temperature filter 20, a heat recovery and gas filter system 30, a three-way valve 40 and an independent stack 60, wherein said dual-purpose reactor 10 consists of a connected combustion chamber 11 and a gas-solid suspension chamber 12.

In the system, the combustion chamber 11 and a rotary incinerator 72 are connected to clinker calcineration system 52 of cement production system 50, to receive gases generated in cement manufacture process, such as hot gases from clinker cooler 524. In addition, said combustion chamber has an inlet to receive alkaline materials or waste residues from the raw material preparation and homogenization system 51 such as from raw meal silo.

Three-way valve 40 is connected to the high temperature filter 20, combustion chamber 11 and rotary kiln respectively, and through which decomposed alkaline materials can be discharged either into the rotary kiln of clinker calcineration system or into the combustion chamber under the condition that the rotary kiln is not capable to accept so much alkaline materials.

In one aspect of the invention, said three-way valve 40 is connected to the high temperature filter 20, the combustion chamber 11 and the rotary kiln 523 respectively, through which, the decomposed alkaline materials or waste residues are fed either into the combustion chamber for cycling or into the rotary kiln as raw materials for cement production. Said by-pass system is used to discharge hot gases containing high concentration of sulfur, chlorine, potassium and sodium etc. Said by-pass system comprises a cooler 551, an energy recovery and dedusting system 552. Gases drawn from clinker calcineration system are quenched through a cooler 551 and then flow through the heat recovery and dedusting system before releasing to the atmosphere via a stack. Powder collected is conveyed to cement grinding system as raw material mixture for cement production.

Incineration system 70 comprise a feeder 71, and a rotary incinerator 72. Wastes, such as industrial wastes, medical wastes, hazardous wastes or municipal wastes are fed into by feeder 131 and then enter the rotary incinerator 132, where wastes are dried and incinerated. Flue gases from the rotary incinerator are introduced into the combustion chamber 11 for further disposal.

Said clinker calcinations system 52 of cement production line comprises a preheater 521, a calciner 522, a rotary kiln 523 and a cooler 524. Said clinker calcinations system has its own stack to discharge gases generated from clinker calcinations process.

Said by-pass system 55 of cement production line comprises a cooler 551 and an energy recovery and deducting system 522. Exhaust gases from rotary kiln with high concentration of sulfur, chlorine, potassium, and sodium etc. are firstly quenched through a cooler 551 and then flow through the heat recovery and dedusting system 552 before releasing to the atmosphere via a stack. Powder collected is conveyed to cement grinding system 53 as raw material mixtures.

Detail description of the system of the invention is carried out with reference to the method showed in FIG. 1.

According to the embodiment of the invention, alkaline materials from raw material preparation stage of cement production line are introduced into the combustion chamber of the dual-purpose reactor 10. Exhaust gases from the rotary incineration system 72 are also introduced into the combustion chamber of the dual-purpose reactor 10, in which alkaline materials mix, burned together and react with gases at temperature of 850 to 950° C. to remove acid gases, duration time is 6~10 seconds.

As shown in FIG. 2, firstly, hot gases from cooler 524 of cement production line are introduced to the combustion chamber of the dual-purpose reactor 10 and/or to the rotary incinerator via a duct. Also, hot gases from the dedusting devices 552 of the by-pass system can be introduced to the combustion chamber of the dual-purpose reactor 10 and/or to the rotary incinerator. The exit of by-pass system is connected to the combustion chamber and rotary incinerator 132 respectively via gas duct.

Secondly, alkaline materials or wastes from raw material preparation and homogenization system 51 in cement production line 50 are fed into the combustion chamber 11. Fuels or wastes with high caloric value are also are fed into the combustion chamber 11. To guarantee fully incineration of fuel and wastes, fuels are sprayed into the incineration chamber 11 via an injector. Combustion temperature in the combustion chamber 11 maintain not higher than 950° C., which is preferably maintained at 860 to 890° C. is preferred. The total residence time of combustion gases in the combustion chamber and the gas-solid suspension chamber is 6 to 8 seconds, preferably 8 to 10 seconds.

After combustion, mixture of gases and solid powders is released from the combustion chamber and enter the gas-solid suspension chamber 12, which is a spouted and swirling compound type, where gases and solid powders in said mixture are fully mixed, contacted and reacted, and finally the flue gases are cleaned.

Then, gas-solid mixtures from the gas-solid suspension chamber 12 are introduced into, through a duct, the high temperature filter 20, where solid powder are separated from high temperature gases. Efficiency of the herein said high temperature filter is not less than 92%.

Hot gases separated from the solids by the high temperature filter are conveyed to the heat energy recovery and dedusting system 30, and finally are released into the atmosphere. The heat energy recovery and dedusting system 30 may be connected to other system to utilize the heat energy of hot gases. In on aspect of the invention, gases from the high temperature filter can be released to the atmosphere, such as via the dependent stack 60 at temperature about 120 to 150°

C. Solid powder collected by the high temperature filter can be fed into the rotary kiln 523 of cement production system 50 and/or to the incineration chamber 11 for recycling. Cement production system has its own stack for discharging gases generated from clinker manufacture process.

Solids collected by the high temperature filter are decomposed alkaline materials, which are introduced to the rotary kiln 523 via a three-way valve as cement raw materials.

By using the method and system of the present invention, namely Cement Processing—Oxidative Waste & Energy Recovery, C-POWER, gases released from the system of the present invention to the atmosphere achieves the following effects: dioxin<0.01 ngTEQ/$m^3$, volatile organic carbon<5 mg/$m^3$, HCl<6 mg/$m^3$, HF<0.5 mg/$m^3$, $SO_2$<25 mg/$m^3$, $NO_x$<200 mg/$m^3$, CO<45 mg/$m^3$, heavy metals (first class: Sb, As, Pb, Cr, Co, Cu, Mn, Ni, V), heavy metals (second class: Cd and Th)<0.05 mg/$m^3$, Hg<0.05 mg/$m^3$ (values are converted value referring the standard state of 11% dry gases). Each data meet the emission standards of waste incinerator adopted by China and Europe. In addition, cement production can be increased by 10~15% by using present invention.

The invention technology for waste combustion gas treatment by combining a dual-purpose reactor (DPR) with cement production system simplify the treatment procedures and equipments, and also completely remove acid gases and decompose dioxin and their precursors, which will prevent dioxin reformation during gas cooling process. Therefore, it is no need to recollect and treatment dioxins reformed during cooling process like conventional technology. In addition, by using the method and system of the present invention, cement outputs will be increased since during flue gases treatment process larger amounts of raw materials are decomposed.

The method and system of the present invention, namely Cement Processing—Oxidative Waste & Energy Recovery, C-POWER is a new technology which combines the waste treatment and energy recycling technology and help to benefit the environmental and social development.

While the present invention has been described with reference to explanatory embodiments, it is to be understood that the terms used herein are terms of description rather than limitation. Various changes and modifications may be made without departing from the scope and spirit of the present invention as set forth in the specifications.

The invention claimed is:

1. A method for treatment of combustion gas and increase of cement production by combining a dual-purpose reactor with cement production system, wherein said dual-purpose reactor comprises a connected combustion chamber and a gas-solid suspension chamber, said method includes the following procedures:
   (a) high temperature gases from clinker manufacture stage of cement production line are introduced to the combustion chamber of the dual-purpose reactor and/or to the rotary incinerator of a waste combustion system,
   (b) alkaline materials or waste residues from cement production system are fed into the combustion chamber of the dual-purpose reactor,
   (c) fuel or wastes of high caloric value are injected into the combustion chamber to raise and then stabilize the temperature in the combustion chamber,
   (d) combustion gas is introduced into the combustion chamber and/or to the gas-solid suspension chamber,
   (e) under high-temperature condition, mixture of gases and said alkaline materials or waste residues in the combustion chamber enters the gas-solid suspension chamber of dual-purpose reactor in a spiral pattern, in which said gases are completely mixed with the alkaline materials or waste residues and reacted, so that acid gases, dioxins and precursors thereof are removed,
   (f) gas-powder mixture released from the dual-purpose reactor is introduced into a high-temperature gas filter where the gases are separated from solid materials, and after energy recovery and filter processing, the gases are then released into the atmosphere via an independent stack as nontoxic gases with a temperature of 120 to 150° C.,
   (g) decomposed alkaline materials or wastes are transferred either to the combustion chamber of the dual-purpose reactor for recycling or to cement kiln as raw materials.

2. A method according to claim 1, wherein said waste combustion gas is flue gases generated from combustion of industrial wastes, medical wastes, hazardous wastes and municipal wastes in a rotary incinerator.

3. A method according to claim 1, wherein said high temperature gases are from a grate cooler in clinker manufacture stage.

4. According to claim 1, high temperature gases from a by-pass system of cement production line also are introduced into the combustion chamber of DPR and/or to the rotary kiln of incineration system.

5. A method according to claim 1, wherein said high temperature gases, fuel and wastes of high caloric value are fed into the rotary incinerator of incineration system.

6. A method according to claim 1, wherein residence time of said fuels or wastes of high caloric value in the combustion chamber is not less than 2 seconds.

7. A method according to claim 1, wherein the temperature in procedure (c) to (e) is maintained at 850 to 950° C., preferably at 850 to 920° C. and the most preferably at 860 to 890° C.

8. A method according to claim 1, wherein the amounts of said alkaline materials or waste residuals is 20 to 85 times of their molar mass of chemical reaction process.

9. A method according to claim 1, wherein total residence time of the combustion gas in the combustion chamber and the gas-solid suspension chamber is 6 to 8 seconds, preferably 8 to 10 seconds.

10. A system for the method for treatment of combustion gas and increase of cement production by combining a dual-purpose reactor with cement production system according to claim1, which includes: a dual-purpose reactor, a high-temperature filter, a heat recovery and gas filter system, a three-way valve and an independent stack, wherein said dual-purpose reactor consists of a connected combustion chamber and a gas-solid suspension chamber, wherein the combustion chamber is connected to a grate cooler of cement production system to receive high temperature gases produced during clinker manufacture process, and said combustion chamber has an inlet to receive alkaline materials or residuals from raw material preparation and homogenization system of cement production, said three-way valve is connected to the high temperature filter, the combustion chamber and the rotary incinerator of cement production system respectively, and through which decomposed alkaline materials or residues are fed into the combustion chamber for recycling or into the rotary kiln of cement production system as raw materials to produce cement clinker.

11. A method according to claim 7, wherein the temperature in procedure (c) to (e) is maintained at 850 to 920° C.

12. A method according to claim 11, wherein the temperature in procedure (c) to (e) is maintained at 860 to 890° C.

13. A method according to claim 9, wherein total residence time of the combustion gas in the combustion chamber and the gas-solid suspension chamber is 8 to 10 seconds.

14. A system for the method for treatment of combustion gas and increase of cement production by combining a dual-purpose reactor with cement production system according to claim 2, which includes: a dual-purpose reactor, a high-temperature filter, a heat recovery and gas filter system, a three-way valve and an independent stack, wherein said dual-purpose reactor consists of a connected combustion chamber and a gas-solid suspension chamber,
wherein the combustion chamber is connected to a grate cooler of cement production system to receive high temperature gases produced during clinker manufacture process, and said combustion chamber has an inlet to receive alkaline materials or residuals from raw material preparation and homogenization system of cement production,
said three-way valve is connected to the high temperature filter, the combustion chamber and the rotary incinerator of cement production system respectively, and through which decomposed alkaline materials or residues are fed into the combustion chamber for recycling or into the rotary kiln of cement production system as raw materials to produce cement clinker.

15. A system for the method for treatment of combustion gas and increase of cement production by combining a dual-purpose reactor with cement production system according to claim 3, which includes: a dual-purpose reactor, a high-temperature filter, a heat recovery and gas filter system, a three-way valve and an independent stack, wherein said dual-purpose reactor consists of a connected combustion chamber and a gas-solid suspension chamber,
wherein the combustion chamber is connected to a grate cooler of cement production system to receive high temperature gases produced during clinker manufacture process, and said combustion chamber has an inlet to receive alkaline materials or residuals from raw material preparation and homogenization system of cement production,
said three-way valve is connected to the high temperature filter, the combustion chamber and the rotary incinerator of cement production system respectively, and through which decomposed alkaline materials or residues are fed into the combustion chamber for recycling or into the rotary kiln of cement production system as raw materials to produce cement clinker.

16. A system for the method for treatment of combustion gas and increase of cement production by combining a dual-purpose reactor with cement production system according to claim 4, which includes: a dual-purpose reactor, a high-temperature filter, a heat recovery and gas filter system, a three-way valve and an independent stack, wherein said dual-purpose reactor consists of a connected combustion chamber and a gas-solid suspension chamber,
wherein the combustion chamber is connected to a grate cooler of cement production system to receive high temperature gases produced during clinker manufacture process, and said combustion chamber has an inlet to receive alkaline materials or residuals from raw material preparation and homogenization system of cement production,
said three-way valve is connected to the high temperature filter, the combustion chamber and the rotary incinerator of cement production system respectively, and through which decomposed alkaline materials or residues are fed into the combustion chamber for recycling or into the rotary kiln of cement production system as raw materials to produce cement clinker.

17. A system for the method for treatment of combustion gas and increase of cement production by combining a dual-purpose reactor with cement production system according to claim 5, which includes: a dual-purpose reactor, a high-temperature filter, a heat recovery and gas filter system, a three-way valve and an independent stack, wherein said dual-purpose reactor consists of a connected combustion chamber and a gas-solid suspension chamber, wherein the combustion chamber is connected to a grate cooler of cement production system to receive high temperature gases produced during clinker manufacture process, and said combustion chamber has an inlet to receive alkaline materials or residuals from raw material preparation and homogenization system of cement production
said three-way valve is connected to the high temperature filter, the combustion chamber and the rotary incinerator of cement production system respectively, and through which decomposed alkaline materials or residues are fed into the combustion chamber for recycling or into the rotary kiln of cement production system as raw materials to produce cement clinker.

18. A system for the method for treatment of combustion gas and increase of cement production by combining a dual-purpose reactor with cement production system according to claim 6, which includes: a dual-purpose reactor, a high-temperature filter, a heat recovery and gas filter system, a three-way valve and an independent stack, wherein said dual-purpose reactor consists of a connected combustion chamber and a gas-solid suspension chamber,
wherein the combustion chamber is connected to a grate cooler of cement production system to receive high temperature gases produced during clinker manufacture process, and said combustion chamber has an inlet to receive alkaline materials or residuals from raw material preparation and homogenization system of cement production,
said three-way valve is connected to the high temperature filter, the combustion chamber and the rotary incinerator of cement production system respectively, and through which decomposed alkaline materials or residues are fed into the combustion chamber for recycling or into the rotary kiln of cement production system as raw materials to produce cement clinker.

19. A system for the method for treatment of combustion gas and increase of cement production by combining a dual-purpose reactor with cement production system according to claim 7, which includes: a dual-purpose reactor, a high-temperature filter, a heat recovery and gas filter system, a three-way valve and an independent stack, wherein said dual-purpose reactor consists of a connected combustion chamber and a gas-solid suspension chamber,
wherein the combustion chamber is connected to a grate cooler of cement production system to receive high temperature gases produced during clinker manufacture process, and said combustion chamber has an inlet to receive alkaline materials or residuals from raw material preparation and homogenization system of cement production,
said three-way valve is connected to the high temperature filter, the combustion chamber and the rotary incinerator of cement production system respectively, and through which decomposed alkaline materials or residues are fed into the combustion chamber for recycling or into the rotary kiln of cement production system as raw materials to produce cement clinker.

20. A system for the method for treatment of combustion gas and increase of cement production by combining a dual-purpose reactor with cement production system according to claim 8, which includes: a dual-purpose reactor, a high-temperature filter, a heat recovery and gas filter system, a three-way valve and an independent stack, wherein said dual-purpose reactor consists of a connected combustion chamber and a gas-solid suspension chamber,     wherein the combustion chamber is connected to a grate cooler of cement production system to receive high temperature gases produced during clinker manufacture process, and said combustion chamber has an inlet to receive alkaline materials or residuals from raw material preparation and homogenization system of cement production,     said three-way valve is connected to the high temperature filter, the combustion chamber and the rotary incinerator of cement production system respectively, and through which decomposed alkaline materials or residues are fed into the combustion chamber for recycling or into the rotary kiln of cement production system as raw materials to produce cement clinker.

\* \* \* \* \*